United States Patent [19]
Monaghan et al.

[11] Patent Number: 5,678,867
[45] Date of Patent: Oct. 21, 1997

[54] HOSE FITTINGS

[75] Inventors: David Monaghan; Gary Robert Dickenson, both of Kensington, Australia

[73] Assignee: A.C.J. Enterprises PTY Ltd., Kensington, Australia

[21] Appl. No.: 522,665

[22] Filed: Sep. 1, 1995

[30] Foreign Application Priority Data

Oct. 7, 1994 [AU] Australia ................. PM8642

[51] Int. Cl.$^6$ ........................................ F16L 33/22
[52] U.S. Cl. .............................. 285/242; 285/253
[58] Field of Search ......................... 285/242, 243, 285/249, 404, 245, 253, 252

[56] References Cited

U.S. PATENT DOCUMENTS

| | | | |
|---|---|---|---|
| 185,326 | 12/1876 | Jones | 285/242 |
| 1,428,949 | 9/1922 | Eastman | 285/249 |
| 2,513,115 | 6/1950 | Sprigg | 285/249 |
| 3,129,022 | 4/1964 | Avery | 285/249 |
| 3,222,091 | 12/1965 | Marshall | 285/243 |
| 3,310,323 | 3/1967 | Galloway et al. | 285/249 |
| 3,367,683 | 2/1968 | Mattson | 285/243 |
| 3,457,359 | 7/1969 | Souc | 285/243 |
| 3,993,330 | 11/1976 | Göransson | 285/243 |
| 4,062,572 | 12/1977 | Davis | 285/249 |
| 4,188,051 | 2/1980 | Burge | 285/249 |

*Primary Examiner*—Eric K. Nicholson
*Attorney, Agent, or Firm*—Oblon, Spivak, McClelland, Maier & Neustadt, P.C.

[57] ABSTRACT

A hose fitting assembly which includes a relatively rigid tubular element, an outer sleeve or element defining with a tail of the element an annular chamber for receiving an end part of the hose, a thrust mechanism for compressing the hose axially into contact with the tail, a mechanism locking the outer sleeve to the inner element and a thrust member for completing the fastening.

12 Claims, 8 Drawing Sheets

HOSE FITTINGS

BACKGROUND OF THE INVENTION

1. Field of the Invention

This invention relates to the attachment of hoses to metal and other relatively rigid tubular fittings to enable the hose to be connected, for example, to a tap or valve or to another length of hose such as via a similar or complementary metal fitting. The invention relates particularly, although not necessarily exclusively, to fittings such as "hosetails" for rubber hose of the large bore and/or high pressure type.

2. Discussion of the Background

A significant and long-recognized difficulty is the tendency of a fitting to be ejected by fluid pressure within the hose, especially when the fitting, e.g. a "hosetail" is inside the hose. Clearly a metal sleeve, however thin, presents a substantial area in the axial direction, and particularly in the case of a hose of large bore and/or carrying high pressure liquid, the rejective forces can present formidable problems.

Known forms of hosetails consist essentially of a barbed or serrated tail portion secured within the end part of a hose by means of bands or clamps. Many such contrivances are of undesirably low holding capacity—often well below that of the material of the hose with which they have been used.

Most hoses are manufactured to have a safety margin of 4:1 i.e. the "burst" pressure is four times a typical or rated working pressure. However, it is common practice to test the fitted assembly to 1.5 or twice the working pressure. Attempts to reduce this "performance gap" have included the hydraulic swaging of fittings to the hose. However, the hose wall thickness and type of construction can impose severe limitations on the pressure capacity of this method. Also the swaged fittings are not, in general, reusable. This disadvantage can seriously reduce the cost-effectiveness of the method.

SUMMARY OF THE INVENTION

Objects of the invention are to provide reusable hose couplings for both suction and delivery hoses that can withstand a wide range of rated burst pressures, can be made in a variety of materials, are reliable in arduous and hazardous situations and which meet or exceed a wide diversity of customer specifications with an ample safety margin to promote confidence in the product.

These and other objects and advantages will become apparent hereinafter.

For the purposes of the following description, terms such as "front", "forward", "rear" and "rearward" are to be understood as referring to a fitting to a "front" end portion of a hose. That is to say, the fitting forms a forward continuation of the hose itself. Also, although the invention is described with particular reference to a rubber hose, it is by no means necessarily limited thereto.

According to the invention in one aspect, means are provided for attaching to a front end portion of a hose a relatively rigid tubular metal fitting including an inner sleeve having a tail receivable within said end portion, an outer sleeve locatable generally rearwardly of said inner sleeve to define therewith a chamber adapted to receive said hose portion and radial compression means operable to squeeze the hose between said sleeves to thereby restrain mutual rejection of the hose and fitting due to fluid pressure in the hose.

In another aspect the invention provides means for fastening within the end of a hose the tail of a relatively rigid tubular fitting, including an outer sleeve, means for locking the outer sleeve against axial movement relatively to said fitting, thrust means axially insertable between the hose and the outer sleeve end and in cooperation with the latter to compress the hose axially into contact with said tail of the fitting and means for locking the thrust unit against movement relative to the outer sleeve.

According to a further aspect of the invention, means are provided for attaching to a front end portion of a hose a relatively rigid tubular metal fitting including an inner sleeve having a tail receivable within said end portion, an outer sleeve locatable generally rearwardly of the inner sleeve, the sleeves respectively defining radially outwardly and inwardly addressed frusto-conical surface portions defining a hose end receiving annular chamber of which the radial width decreases and increases as the inner sleeve moves respectively rearwardly and forwardly relatively to outer sleeve, said sleeves being axially compressible to compress the hose end portion in said chamber, and means for interlocking the sleeves against relative axial separation when the axial compression forces are removed.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
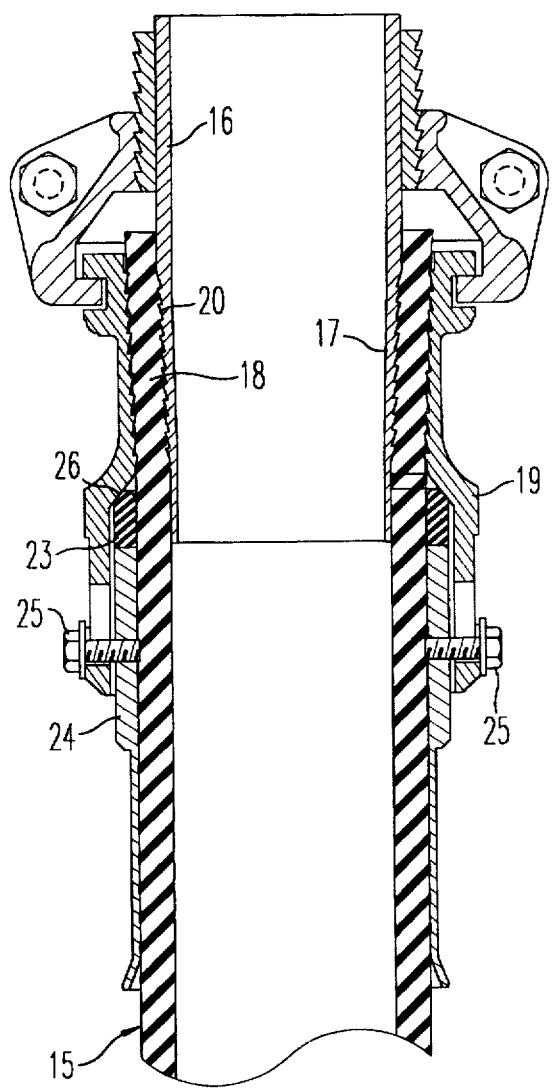
FIG. 1 shows in axial sectional view, a practical embodiment of coupling a "loose" assembly according to the invention applied to a hose.

Referring to the drawings in greater detail there is shown an assembly, substantially entirely of metal, for being coupled to the end of a hose 15. The assembly includes an inner element or sleeve 16 of which a tail 17 is receivable within an end portion 18 of hose 15, and an outer sleeve 19. Sleeves 16 and 19 respectively define radially outwardly and inwardly addressed serrated frusto-conical surface portions 20 and 21 defining a hose-end receiving chamber 22. Clearly, as sleeve 16 moves rearwardly and/or sleeve 19 moves forwards, the width of chamber 22 will decrease. Conversely, as sleeves 16 and 19 move axially away from each other, chamber 22 expands.

The end portion 18 of the hose is thus clamped between the tapered/serrated surfaces of the inner and outer sleeves. The taper tends to act as a wedge, converting the axial thrust to a radial thrust, with an increased magnitude according to the taper angle. Serration enhances the grip by tending to prevent the hose from slipping.

It appears that the material of the hose tends to stretch rather than resist the force which tends to separate the fitting and the hose. As the hose stretches its wall thickness decreases, which tends to reduce the available clamping force and frictional resistance. Flexible thrust ring 23 and pressure inducing sleeve 24 tend to sustain and maintain the clamping force, increasing friction, thereby minimizing or reducing the tendency of the hose to slip from the coupling.

To secure the assembly, firstly the metal pressure inducing element or sleeve 24 is passed over the hose 15 followed by the rubber pusher or thrust ring 23, followed in turn by sleeve 19. If desired, ring 23 and sleeve 24 may be formed as a thrust unit, in which case such unit must clearly be slipped metal first onto the end of the hose, so that ring 23 is "foremost" in the sense used herein.

Figure 2:
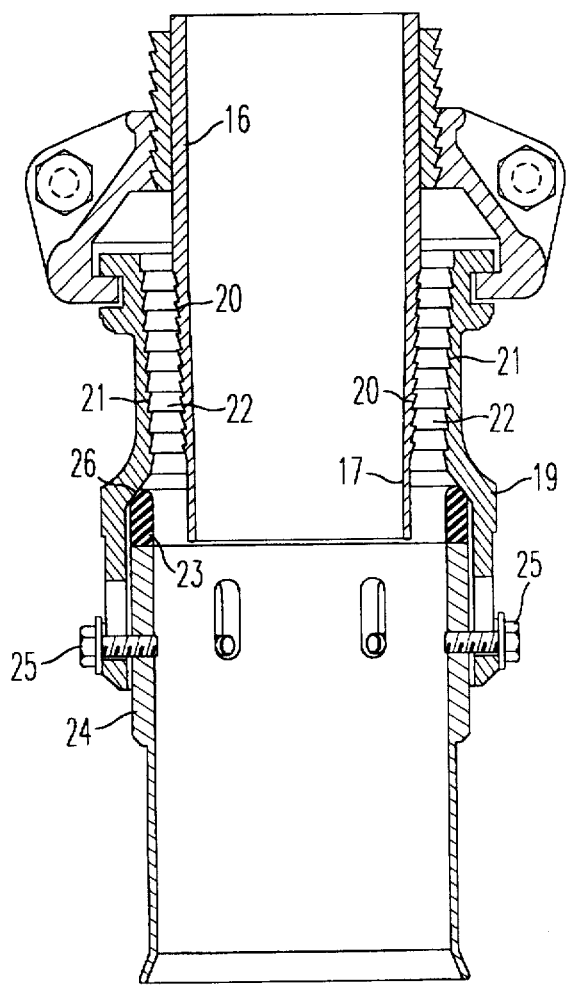
FIG. 2 is a view similar to FIG. 1 but omitting the hose.
Figure 3:
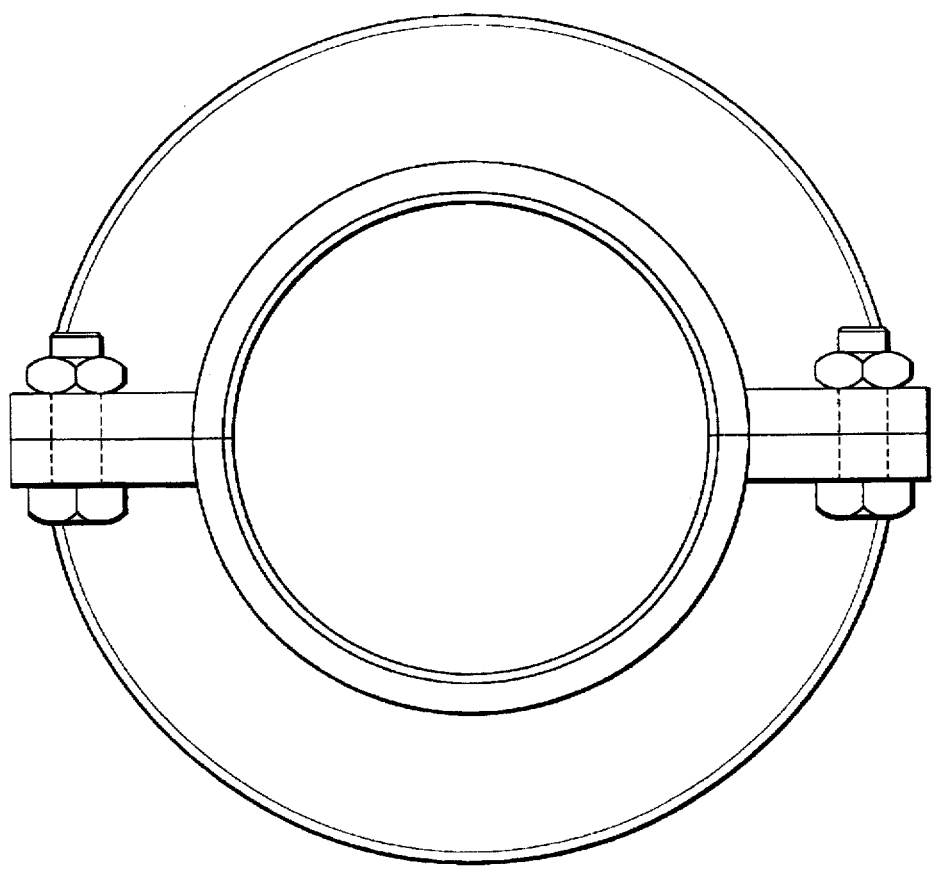
FIGS. 3 and 4 are respectively a front elevational and axial sectional views of a bipartite locking ring which is a part of the assembly shown in FIGS. 1 and 2.
Figure 4:
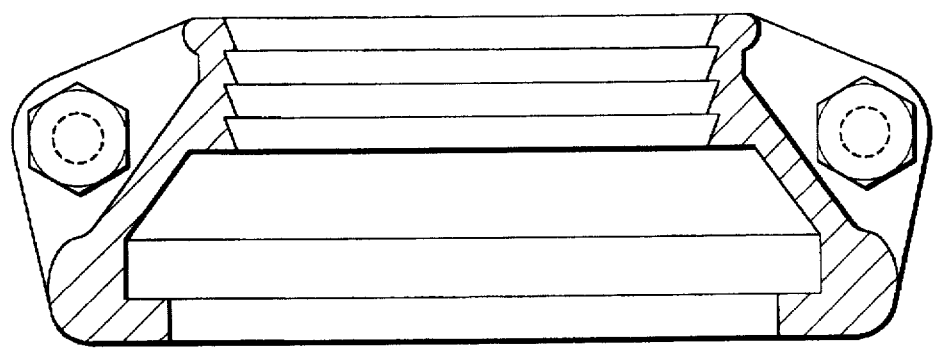
Figure 5:
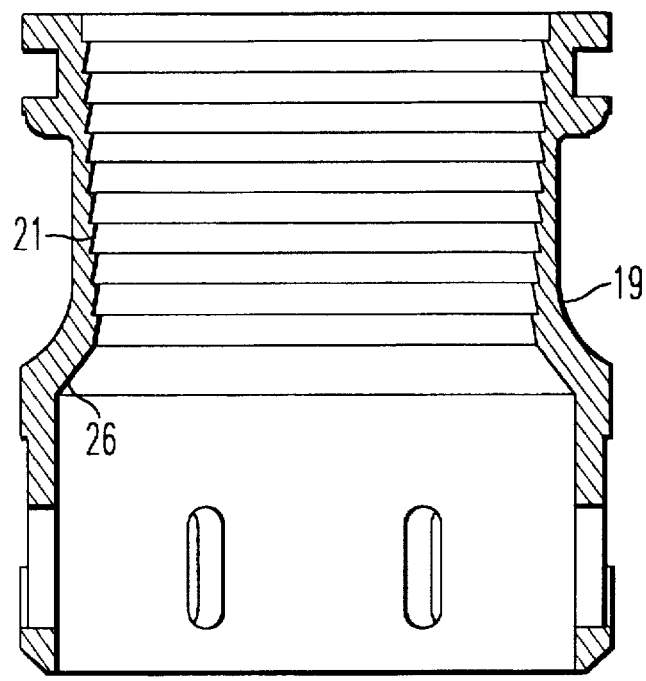
FIGS. 5 and 6 are respectively an axial sectional view and a rear elevational view of an outer sleeve or forming another part of the assembly shown in FIGS. 1 and 2.
Figure 6:
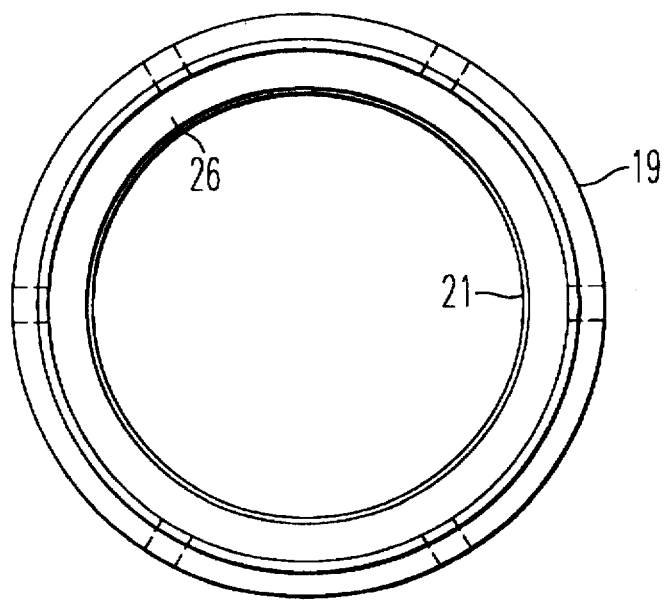
Figure 7:
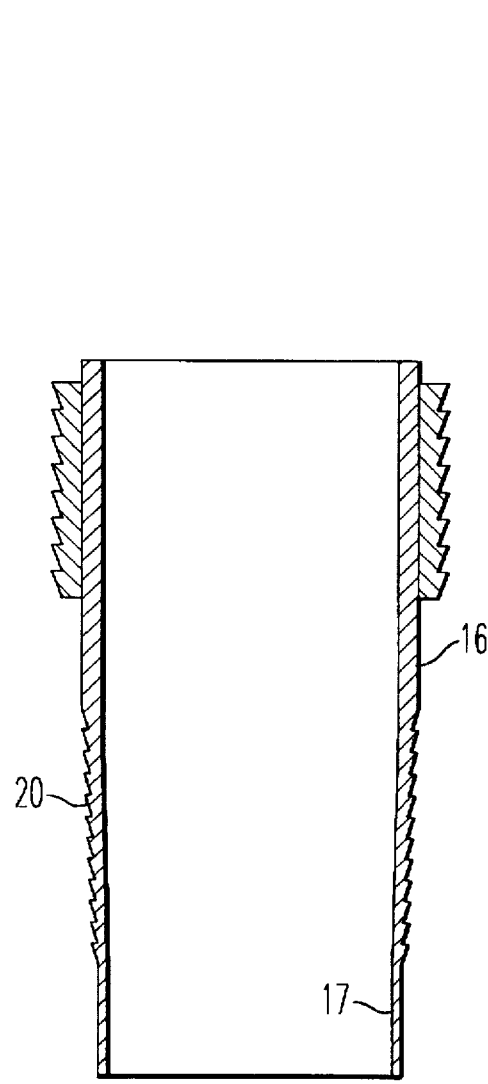
FIG. 7 is an axial sectional view of an inner sleeve forming another part of the assembly shown in FIGS. 1 and 2.
Figure 8:
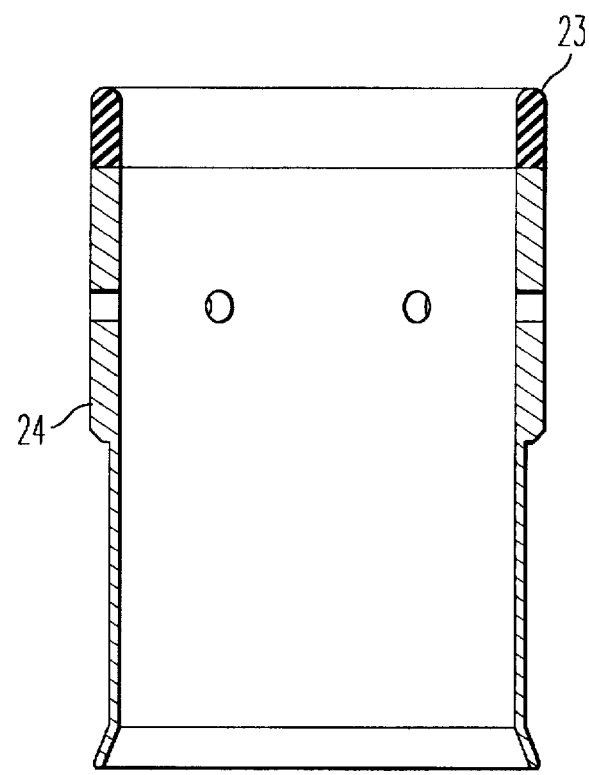
FIGS. 8 and 9 are respectively an axial sectional and a rear elevational view of a pressure ring/push element forming another part of the assembly shown in FIGS. 1 and 2.
Figure 9:
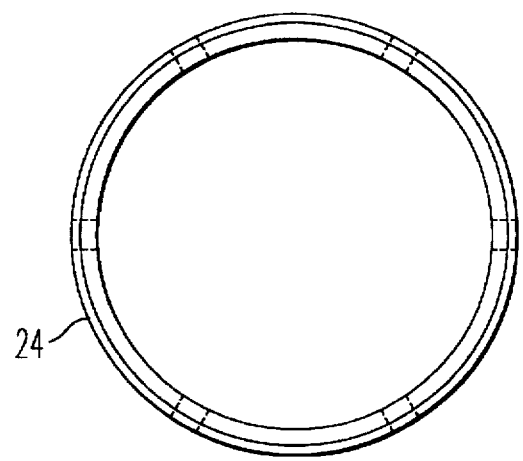
Figure 10:
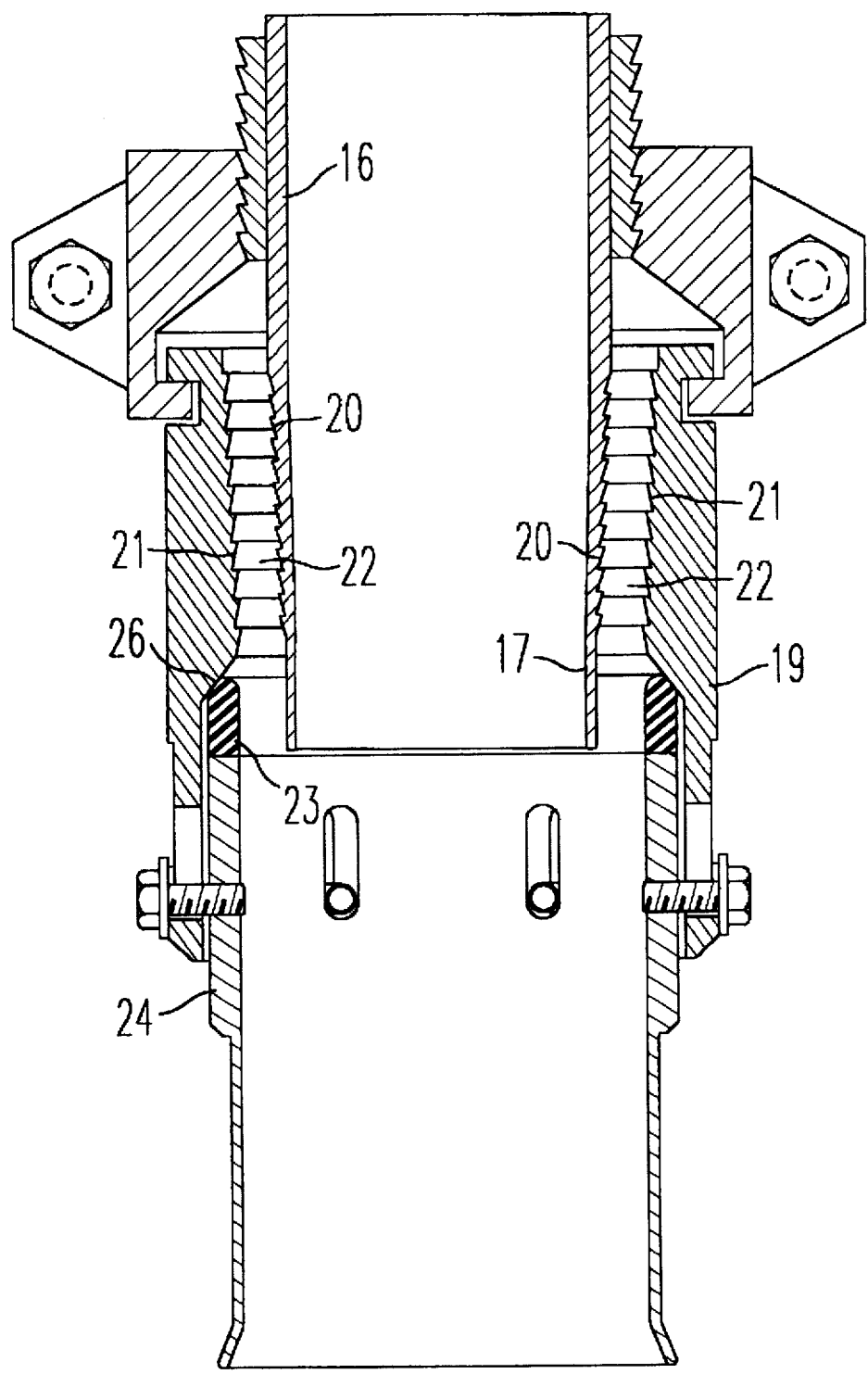
FIG. 10 is view similar to FIG. 2 of another practical embodiment of the coupling assembly according to the invention, very similar to that shown in FIGS. 1 to 9 but wherein the outer configurations of the outer sleeve and locking element are somewhat modified or simplified.
Figure 11:
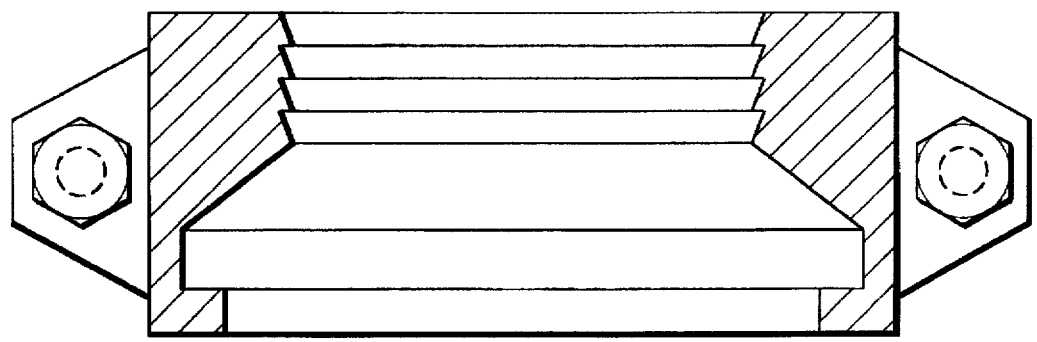
FIGS. 11 and 12 are respectively an axial elevational view and a sectional view of the modified locking element.
Figure 12:
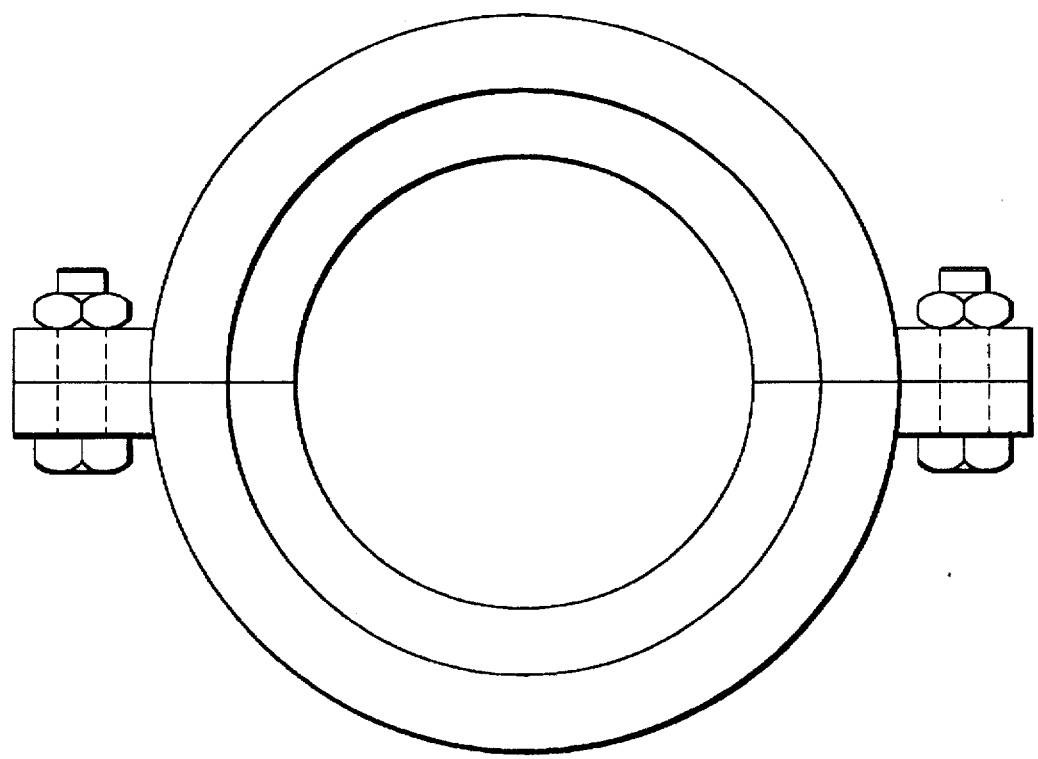
Figure 13:
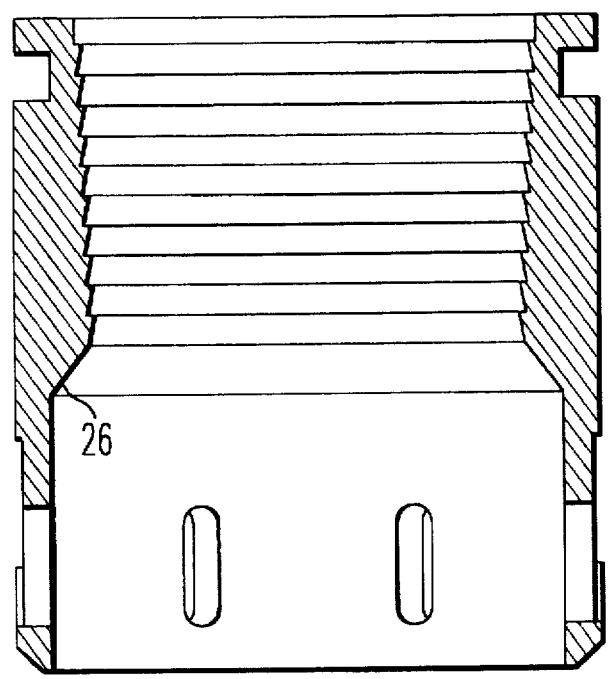
FIGS. 13 and 14 are respectively an axial sectional view and an elevation view of the modified/simplified outer sleeve.
Figure 14:
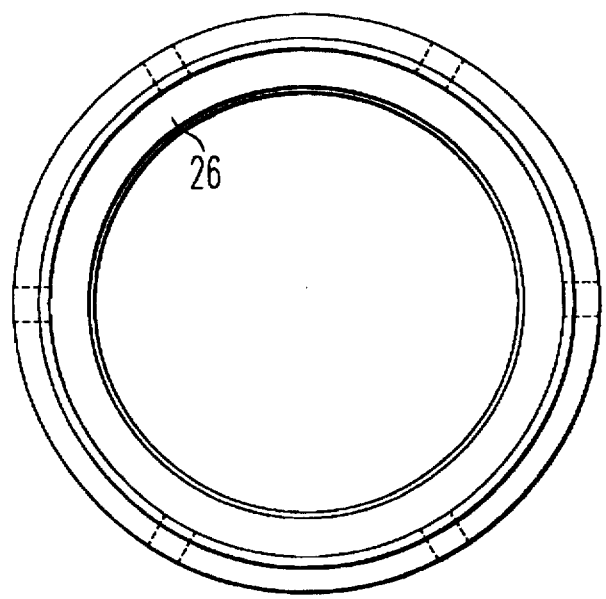
Figure 15A:
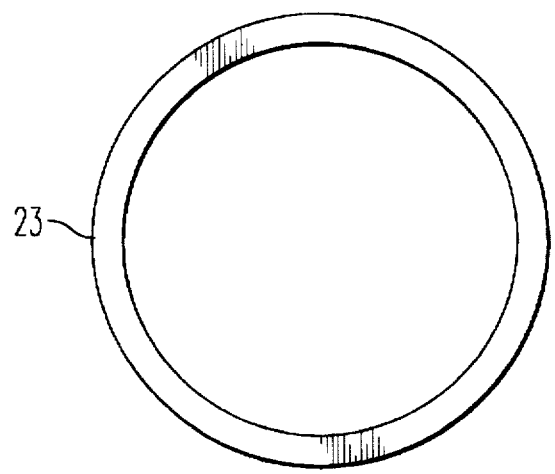
FIG. 15 shows in further detail various aspects of a compressible thrust compression ring forming part of the assembly.
Figure 15B:
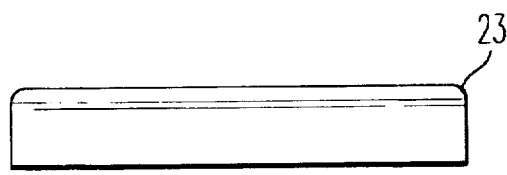
Figure 15C:
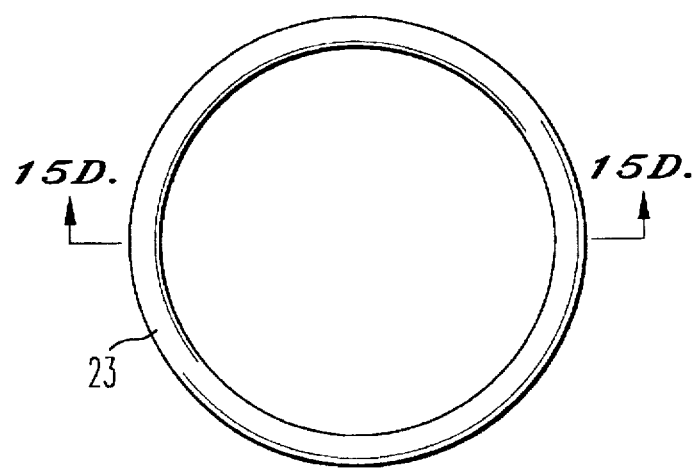
Figure 15D:
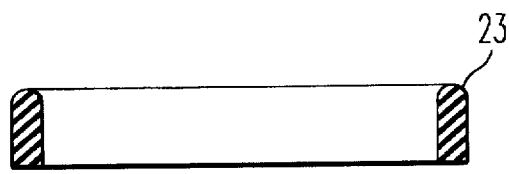

With sleeve 19, ring 23 and sleeve 24 pushed back sufficiently clear of the portion 18 of hose 15, inner sleeve 16 is inserted tail first into hose portion 18 and axial compression is applied to squeeze the inner and outer sleeves into the relationship shown in FIGS. 1, 2 and 10, progressively compressing the rubber of end 18 within the progressively decreasing width of chamber 22 (FIG. 2).

Thus, the tail of the inner sleeve is characterized by an outer rearwardly-converging frusto-conical surface cooperable with an inner forwardly-diverging frusto-conical surface of the outer sleeve to define the aforesaid chamber in which the end of the hose is radially compressed by axial pressure applied to the inner and outer sleeves, e.g. by means of an hydraulic press (not shown). Under such compression there is a tendency for hose material to be forced to move or slip backwards relative to the conical surfaces. This tendency can be reduced by the peripheral barbs or serrations formed by or in the surfaces.

Furthermore the compressed hose rubber acts like a spring against the relative axial movement of the inner and outer sleeves. To prevent such movement the sleeves may be locked together as shown by a bipartite locking ring (FIGS. 3, 4, 11 and 12).

The compression which the present invention is capable of may be so great as virtually to solidify the rubber. Therefore when the fitting of the invention is complete, the hose end may physically resemble a rigid formation locked by its flare or "bell" against axial movement and be further secured by the barbs or serrations engaging with the sleeve serrations which molded them when the rubber was relatively plastic. Advantageously, further locking is provided by the rubber thrust ring 23 positioned at the rear of hose compression chamber 22.

For this purpose, at the outer sleeve's rear end there may be a portion of somewhat expanded internal diameter to receive ring 23 and behind it the metal pressure inducing sleeve 24 whereby a forward thrust may be applied to the rear face of ring 23. This forward axial thrust is converted to an inward radial thrust by the forward part of ring 23 bearing against rearwardly diverging surface 26 within sleeve 19.

The ring's axial section may be of a D-sloped formation as shown, with the convex part facing forwards, i.e. facing the compressed hose material in the chamber. Any tendency of the hose end to retract will be resisted by the pressure ring. Indeed the last mentioned may be so located that any substantial retracting of the hose would have to either break the ring or distort it in a virtually impossible manner.

The dimensions, bulk modulus, coefficient of friction and other physical properties of the pressure ring may need to be carefully chosen relatively to the thickness and general specification of the hose. Clearly, the ring must not be already so rigid as will in effect be nearly a continuation of the outer sleeve material. Equally clearly it must not be so low in modulus as to readily deform under forces which tend to disrupt the connexion.

It will be seen that FIG. 1 is a "loose" assembly because ring 23 is not yet compressed. The sleeve 24 has yet to be pushed forwards to the extent permitted by the length of the slots in sleeve 19. The volume into which rubber 23 is pushed is preferably somewhat smaller than that of the rubber itself to allow for compression of 23.

The means for interlocking the sleeves may include a ring threaded to the outside of a forward portion of the inner sleeve, to be turned until it abuts a flat forwardly directed face of the outer ring to which it can then be bolted. Additionally or alternatively clamping means may be provided to assist in the locking action. Suitable bolts 25 or other means can also be provided for locking the pressure sleeve to the outer sleeve once the pressure ring has been sufficiently compressed.

It will be clear from the foregoing that the invention provides a reusable and relatively simple, strong, secure and versatile hose fitting which is suitable for manufacture in a variety of materials.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A hose fitting, which comprises:
   a mechanism attaching to a front end portion of a hose a relatively rigid tubular metal fitting including an inner sleeve having a tail receivable within said end portion;
   an outer sleeve locatable rearwardly of said inner sleeve to overlap said inner sleeve and to define therewith an annular chamber to receive said front end portion of the hose;
   a radial compression mechanism squeezing hose material within said chamber against and around the inner and outer sleeves and restraining separation of the hose and the fitting, said compression mechanism including a thrust mechanism axially insertable between the hose and the rear end of the outer sleeve, said thrust mechanism cooperating with the outer sleeve and compressing the hose radially into contact the said tail; and
   a locking mechanism, engageable while said compression mechanism is operable, said locking mechanism interlocking said inner and outer sleeves and said thrust mechanism.

2. A hose fitting according to claim 1 wherein the thrust mechanism includes a pressure inducing sleeve and a ring located forwardly of the pressure inducing sleeve, said ring being compressible within a variable volume region defined by the hose, the outer sleeve and a forward end of the pressure inducing sleeve to exert a restraining force on the hose and thereby enhance fastening of the end of the hose.

3. A hose fitting as claimed in claim 2 wherein a forwardly-facing part of the ring is convex shaped.

4. A hose fitting as claimed in claim 3 wherein the portion of the outer sleeve abutting said region includes a rearwardly diverging surface such that a forward axial thrust on the unit is transmitted radially inwardly by the ring.

5. A hose fitting as claimed in claim 3 wherein the portion of the outer sleeve abutting said region includes a rearwardly diverging surface such that a forward axial thrust on the unit is transmitted radially inwardly by the ring.

6. A hose fitting, which comprises:

a mechanism attaching to a front end portion of a hose a relatively rigid tubular metal fitting including an inner sleeve having a tail received within said end portion, an outer sleeve located rearwardly of said inner sleeve and overlapping said inner sleeve to define therewith an annular chamber receiving said front end portion of the hose, a radial compression mechanism squeezing hose material of said front end portion of the hose against and around the outside of said sleeve, said radial compression mechanism restraining separation of the hose and fitting, and a locking mechanism engageable while said compression mechanism is operable, said locking mechanism interlocking said inner and outer sleeves wherein the radial compression mechanism includes a thrust mechanism axially inserted between the hose and the rear end of the outer sleeve, said thrust mechanism cooperating with the outer sleeve and compressing the hose axially into contact with said tail, and wherein the parts to be locked by the locking mechanism comprise the thrust mechanism and the outer sleeve.

7. A hose fitting according to claim 6, wherein the thrust unit includes a pressure inducing sleeve and a ring located forwardly of the pressure inducing sleeve, said ring being compressible within a variable volume region defined by the hose, the outer sleeve and a forward end of the pressure inducing sleeve to exert a restraining force on the hose and thereby enhance the fastening of the end of the hose.

8. A hose fitting as claimed in claim 7 wherein the forwardly-facing part of the ring is convexed shape.

9. A hose fitting as claimed in claim 7 wherein the portion of the outer sleeve abutting said region includes a rearwardly diverging surface such that a forward axial thrust on the unit is transmitted radially inwardly by the ring.

10. A hose fitting as claimed in claim 8, wherein the portion of the outer sleeve abutting said region includes a rearwardly diverging surface such that a forward axial thrust on the unit is transmitted radially inwardly by the ring.

11. A hose fitting, which comprises:

a mechanism attaching to a front end portion of a hose a relatively rigid tubular metal fitting including an inner sleeve having a tail received within said end portion, an outer sleeve located rearwardly of said inner sleeve and overlapping said inner sleeve to define therewith an annular chamber receiving said front end portion of the hose, a radial compression mechanism squeezing hose material of said front end portion of the hose against and around the outside of said sleeve, said radial compression mechanism restraining separation of the hose and fitting, and a locking mechanism engageable while said compression mechanism is operable, said locking mechanism interlocking said inner and outer sleeves wherein the sleeves define radially outwardly and inwardly sloped frusto-conical surface portions defining a hose end receiving annular chamber, a radial width of which decreases and increases as the sleeves move relatively towards and away from each other, respectively, the radial compression mechanism includes a mechanism axially compressing the material of the hose end within said chamber, and wherein the parts to be locked by the locking mechanism comprise said inner and outer sleeves.

12. A hose fitting, which comprises:

a mechanism attaching to a front end portion of a hose a relatively rigid tubular metal fitting including an inner sleeve having a tail receivable within said end portion, said tail having an outwardly facing, first frusto-conical surface portion;

an outer sleeve locatable rearwardly of said inner sleeves and having an inwardly facing second frusto-conical surface portion defining within said first portion an annular chamber receiving said front end portion of the hose, the radial width of said chamber decreasing and increasing as the inner and outer sleeves move relatively towards and away from each other, respectively;

a radial compression mechanism squeezing hose material within said chamber against and around said surface portions, said radial compression mechanisms restraining separation of the hose and fitting; and a locking mechanism, engageable while said compression mechanism is operable, said locking mechanism interlocking said inner and outer sleeves.

* * * * *